United States Patent
Robison et al.

(10) Patent No.: US 10,242,245 B2
(45) Date of Patent: Mar. 26, 2019

(54) SYSTEM AND METHOD OF FINGERPRINT ANTI-SPOOFING PROTECTION USING MULTI-SPECTRAL OPTICAL SENSOR ARRAY

(71) Applicant: Dell Products L.P., Round Rock, TX (US)

(72) Inventors: Charles D. Robison, Bulford, GA (US); Maxwell S. Andrews, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/624,191

(22) Filed: Jun. 15, 2017

(65) Prior Publication Data
US 2018/0365467 A1 Dec. 20, 2018

(51) Int. Cl.
*G06K 9/00* (2006.01)

(52) U.S. Cl.
CPC ....... *G06K 9/0004* (2013.01); *G06K 9/00087* (2013.01)

(58) Field of Classification Search
CPC ............. G06K 9/0004; G06K 9/00006; G06K 9/00087
See application file for complete search history.

(56) References Cited

U.S. PATENT DOCUMENTS

| 7,263,213 B2* | 8/2007 | Rowe ................ G06K 9/00006 340/5.53 |
| 2010/0141380 A1* | 6/2010 | Pishva ................ G06K 9/0012 340/5.2 |
| 2013/0051637 A1* | 2/2013 | Kulcke ............... G06K 9/0012 382/124 |

OTHER PUBLICATIONS

LiCkM3AkaBambii. (Dec. 28, 2014). "Gefahren von Kameras für (biometrische) Authentifizierungsverfahren [31c3] von starbug/Jan Krissler." Retrieved from <https://www.youtube.com/watch?v=pIY6k4gvQsY>; 1 page.

Nixon, Kristin Adair, Valerio Aimale, and Robert K. Rowe. "Spoof detection schemes." Handbook of biometrics. Springer US, 2008; 16 pages.

* cited by examiner

*Primary Examiner* — Phuoc Tran
(74) *Attorney, Agent, or Firm* — Baker Botts L.L.P.

(57) ABSTRACT

Systems and methods for fingerprint anti-spoof protection using a multispectral optical sensor array may include a fingerprint sensor device that may have a fingerprint area sensor, a multi-spectral optical sensor array, and a signal processing device. The fingerprint area sensor may detect a finger in contact with the fingerprint area sensor and may capture a fingerprint sensor image. The multi-spectral optical sensor array may capture spectral reflectance data of the detected finger. The signal processing device may determine authenticity of the detected finger based on the fingerprint sensor image and the spectral reflectance data and provide an authentication result.

18 Claims, 6 Drawing Sheets

SYSTEM AND METHOD OF FINGERPRINT ANTI-SPOOFING PROTECTION USING MULTI-SPECTRAL OPTICAL SENSOR ARRAY

BACKGROUND

Field of the Disclosure

This disclosure relates generally to information handling systems and, more particularly, to fingerprint anti-spoofing protection using a multi-spectral optical sensor array to protect the information handling systems from unauthorized access.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may utilize fingerprint sensor devices that may protect the information handling systems from unauthorized access, and may furthermore employ various techniques known in the art to defeat attempts to access a system using a reproduction of an authorized user's fingerprint, commonly known as a spoof attack. Known methods include pattern analysis, blood flow detection, pulse detection, and multi-spectral analysis.

SUMMARY

In one aspect, a disclosed fingerprint sensor device may include a fingerprint area sensor that may detect a finger in contact with the fingerprint area sensor and may capture a fingerprint sensor image of the detected finger. The fingerprint sensor device may also include a multi-spectral optical sensor array that may capture spectral reflectance data of the detected finger under controlled illumination conditions. The fingerprint sensor device may further include a signal processing device that may collect the fingerprint sensor image of the detected finger from the fingerprint area sensor. The signal processing device may also collect the spectral reflectance data of the detected finger from the multi-spectral optical sensor array during the capture of the fingerprint sensor image of the detected finger. The signal processing device may further compare the spectral reflectance data of the detected finger with each of a plurality of reference spectral profiles associated with a reference finger that may determine the reference spectral profile that may match a placement of the detected finger in contact with the fingerprint area sensor. The reference spectral profile may be associated with one placement of the reference finger in contact with the fingerprint area sensor. The signal processing device may also perform proportional spectral analysis of the spectral reflectance data of the detected finger and the determined reference spectral profile. The signal processing device may further provide a result of the proportional spectral analysis.

In any of the disclosed embodiments of the fingerprint sensor device, the fingerprint sensor device may also include an illumination source that may provide the controlled illumination conditions from the illumination source. The illumination source may also sense ambient light. The controlled illumination conditions may include different wavelengths, different polarization conditions, and different illumination orientations. The different wavelengths may be divided across the spectrum to provide spectral detail in wavelengths that may correspond to unique absorption characteristics of human skin.

In any of the disclosed embodiments of the fingerprint sensor device, the signal processing device may also perform a fingerprint analysis of the fingerprint sensor image of the detected finger with each of a plurality of reference fingerprint templates that may be associated with a reference finger that may determine whether a reference fingerprint template may match a placement of the detected finger in contact with the fingerprint area sensor. The reference fingerprint template may be associated with one placement of the reference finger in contact with the fingerprint area sensor. The signal processing device may further provide a result of the fingerprint analysis.

In any of the disclosed embodiments of the fingerprint sensor device, the signal processing device may combine the result of the proportional spectral analysis with the result of the fingerprint analysis to create an authentication result. The signal processing device may, when the authentication result indicates that the detected finger may be authentic, provide an indication that the detected finger may be authentic, when the authentication result indicates that the detected finger may be unauthorized, provide an indication that the detected finger may be unauthorized, when the authentication result indicates that the authentication result may be inconclusive, provide an indication that the detected finger may be inconclusive and a replacement of the finger in contact with the fingerprint area sensor may be justified, when the authentication result indicates that the detected finger may have been improperly analyzed, provide an indication that the detected finger may have been improperly analyzed and a replacement of the finger in contact with the fingerprint area sensor may be justified, and when the authentication result indicates that the detected finger may be malicious, provide an indication that the detected finger may be malicious and further action may be justified.

In any of the disclosed embodiments of the fingerprint sensor device, the proportional spectral analysis may be based on a slope of spectral shift between the spectral reflectance data of the detected finger and baseline offsets that may be due to changes in power of the illumination source over a duration of time since the reference spectral profiles associated with a reference finger were created.

In any of the disclosed embodiments of the fingerprint sensor device, the signal processing device, for each placement of the reference finger in contact with the fingerprint area sensor during enrollment of the reference finger with the fingerprint sensor device, may collect the spectral reflectance data of the reference finger from the multi-spectral optical sensor array during the capture of the fingerprint sensor image of the reference finger. The multi-spectral optical sensor array may have captured the spectral reflectance data of the reference finger under the controlled illumination conditions. The signal processing device, for each placement of the reference finger, may create the reference spectral profile that may be based on the spectral reflectance data of the reference finger, and may add the reference spectral profile to the reference spectral profiles that may be associated with the reference finger.

In any of the disclosed embodiments of the fingerprint sensor device, the multi-spectral optical sensor array may be located in proximity to the fingerprint area sensor.

In any of the disclosed embodiments of the fingerprint sensor device, the multi-spectral optical sensor array may be integrated within the fingerprint area sensor.

In any of the disclosed embodiments of the fingerprint sensor device, the proportional spectral analysis and the fingerprint analysis may be performed concurrently.

In any of the disclosed embodiments of the fingerprint sensor device, the proportional spectral analysis and the fingerprint analysis may be performed consecutively.

In another aspect, a disclosed method may include detecting, by a fingerprint area sensor, a finger in contact with the fingerprint area sensor. The method may also include, capturing, by the fingerprint area sensor, a fingerprint sensor image of the detected finger. The method may further include, capturing, by a multi-spectral optical sensor array, spectral reflectance data of the detected finger under controlled illumination conditions. The method may also include, collecting, by a signal processing device, the fingerprint sensor image of the detected finger from the fingerprint area sensor. The method may further include, collecting, by the signal processing device, the spectral reflectance data of the detected finger from the multi-spectral optical sensor array during the capture of the fingerprint sensor image of the detected finger. The method may also include, comparing, by the signal processing device, the spectral reflectance data of the detected finger with each of a plurality of reference spectral profiles associated with a reference finger that may determine the reference spectral profile that may match a placement of the detected finger in contact with the fingerprint area sensor. The reference spectral profile may be associated with one placement of the reference finger in contact with the fingerprint area sensor. The method may further include, performing, by the signal processing device, proportional spectral analysis of the spectral reflectance data of the detected finger and the determined reference spectral profile. The method may also include, providing, by the signal processing device, a result of the proportional spectral analysis.

In any of the disclosed embodiments of the method, the method may also include providing the controlled illumination conditions from an illumination source. The method may further include, sensing, by the multi-spectral optical sensor array, ambient light. Controlled illumination conditions may include different wavelengths, different polarization conditions, and different illumination orientations. The different wavelengths may be divided across the spectrum to provide spectral detail in wavelengths that may correspond to unique absorption characteristics of human skin.

In any of the disclosed embodiments of the method, the method may also include performing a fingerprint analysis of the fingerprint sensor image of the detected finger with each of a plurality of reference fingerprint templates associated with a reference finger that may determine whether a reference fingerprint template may match a placement of the detected finger in contact with the fingerprint area sensor. The reference fingerprint template may be associated with one placement of the reference finger in contact with the fingerprint area sensor. The method may further include, providing a result of the fingerprint analysis.

In any of the disclosed embodiments of the method, the method may also include combining the result of the proportional spectral analysis with the result of the fingerprint analysis to create an authentication result. The method may further include, when the authentication result indicates that the detected finger may be authentic, providing an indication that the detected finger may be authentic, when the authentication result indicates that the detected finger may be unauthorized, providing an indication that the detected finger may be unauthorized, when the authentication result indicates that the authentication result may be inconclusive, providing an indication that the detected finger may be inconclusive and a replacement of the finger in contact with the fingerprint area sensor may be justified, when the authentication result indicates that the detected finger may have been improperly analyzed, providing an indication that the detected finger may have been improperly analyzed and a replacement of the finger in contact with the fingerprint area sensor may be justified, and when the authentication result indicates that the detected finger may be malicious, providing an indication that the detected finger may be malicious and further action may be justified.

In any of the disclosed embodiments of the method, the proportional spectral analysis may be based on a slope of spectral shift between the spectral reflectance data of the detected finger and baseline offsets that may be due to changes in power of the illumination source over a duration of time since the reference spectral profiles associated with a reference finger may have been created.

In any of the disclosed embodiments of the method, the method may also include, for each placement of the reference finger in contact with the fingerprint area sensor during enrollment of the reference finger with the fingerprint sensor device, collecting the spectral reflectance data of the reference finger from the multi-spectral optical sensor array during the capture of the fingerprint sensor image of the reference finger, where the multi-spectral optical sensor array captured the spectral reflectance data of the reference finger under controlled illumination conditions, creating the reference spectral profile that may be based on the spectral reflectance data of the reference finger, and adding the reference spectral profile to the reference spectral profiles associated with the reference finger.

In any of the disclosed embodiments of the method, the multi-spectral optical sensor array may be located in proximity to the fingerprint area sensor.

In any of the disclosed embodiments of the method, the multi-spectral optical sensor array may be integrated with the fingerprint area sensor.

In any of the disclosed embodiments of the method, the proportional spectral analysis and the fingerprint analysis may be performed concurrently.

In any of the disclosed embodiments of the method, the proportional spectral analysis and the fingerprint analysis may be performed consecutively.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2A, 2B, 3, 4, and 5 wherein like numbers are used to indicate like and corresponding parts.

Figure 1:
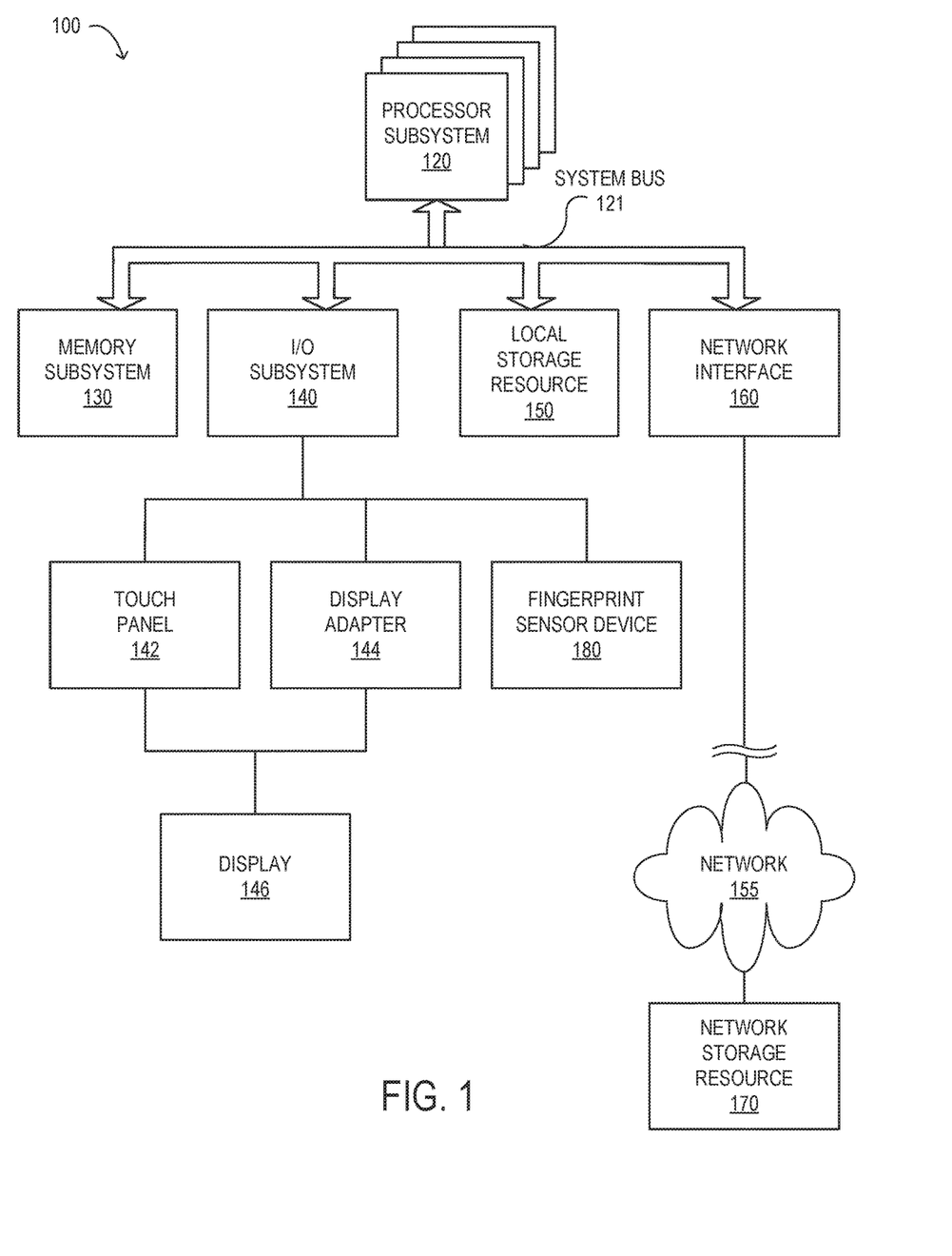
FIG. 1 is a block diagram of selected elements of an embodiment of an information handling system.

Turning now to the drawings, FIG. 1 illustrates a block diagram depicting selected elements of an embodiment of information handling system 100. As shown in FIG. 1, components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, a network interface 160, and a fingerprint sensor device 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to a network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display 146 that is driven by display adapter 144. As will be described in further detail, information handling system 100, or certain components included therein, may utilize fingerprint sensor devices to detect and prevent spoofing attacks against the system. A fingerprint sensor device may protect information handling system 100 from spoofing attacks and prevent unauthorized access. A fingerprint sensor device may utilize fingerprint sensor device 180 that may include a fingerprint area sensor, a multi-spectral optical sensor array, and a multi-spectral fingerprint protection mechanism to ensure information handling system 100 is protected from spoofing attacks, as described in further detail below. Spoofing is the first step of Microsoft Corporation's spoofing identify, tampering with data, repudiation and non-repudiation, information disclosure, denial of service, and elevation of privilege (STRIDE) threat modeling method attack surface and is a foundational piece of building a secure solution. As shown, fingerprint sensor device 180 is coupled to information handling system 100 via I/O subsystem 140.

As will be described in further detail herein, a fingerprint sensor device may use a user biometric anti-spoofing method to detect and subsequently reject attempts to bypass the security mechanism within a fingerprint sensor which is intended to prevent wrong or malicious actors from accessing privileged data or devices by means of replication or otherwise a user's biometric likeness such as a fingerprint. Without an effective anti-spoofing technology integrated deep within a biometric solution, it may be rendered useless and may be an easily exploitable attack surface that may be used to access confidential or other secret data. Typical capacitive fingerprint sensor devices are integrated systems that employ anti-spoof technologies that operate after a fingerprint image has already been captured. In these integrated systems, post-processing software using anti-spoof algorithms, running on a central processor unit (CPU) processor of the integrated system, scans the fingerprint image previously captured for certain anomalies and other information that may indicate that the finger may not be genuine. The post-processing software may run in a high bandwidth capacity and may impact system performance and cause performance delays. The post-processing software is also not available to run in a pre-boot environment. As such, using an integrated system including a capacitive fingerprint sensor device and anti-spoofing technology that is not integrated deep within the biometric solution is not effective, increases the rate of false rejections, impacts system performance, and impacts user experience.

Therefore, a fingerprint sensor device for fingerprint anti-spoofing protection that may utilize a hardware based broad-spectrum illumination source and a multi-spectral optical sensor array during the time of capture of a fingerprint sensor image of a finger and capture spectral reflectance data of the finger to detect spoofing attacks may be a decoupled system. The fingerprint sensor device for fingerprint anti-spoofing protection using a multi-spectral optical sensor array may provide a more effective and stronger spoofing countermeasure, thwart efforts from unauthorized users to gain access to protected systems, and may decrease the burden on system resources and usability impacts.

Figure 2A:
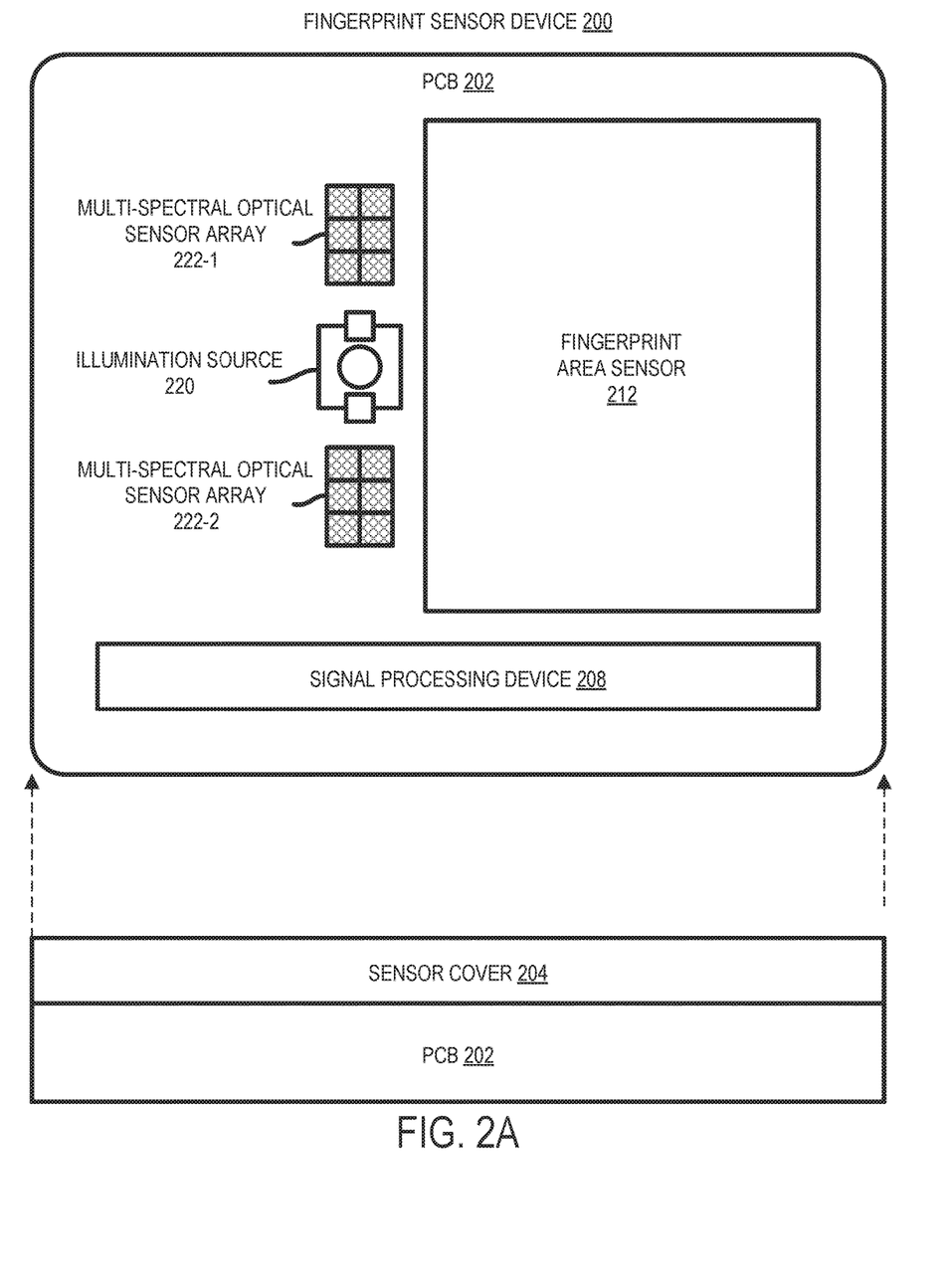
FIGS. 2A and 2B are block diagrams of selected elements of embodiments of fingerprint sensor devices.

Turning now to FIG. 2A, a block diagram of selected elements of an embodiment of a fingerprint sensor device 200 is illustrated. Fingerprint sensor device 200 may be fingerprint sensor device 180 described above. In FIG. 2A, fingerprint sensor device 200 is shown in a schematic representation and is not drawn to scale or perspective. It is noted that, in different embodiments, fingerprint sensor device 200 may be operated with additional or fewer elements.

As shown in FIG. 2A, components of fingerprint sensor device 200 may include, but are not limited to, a printed circuit board (PCB) 202, a signal processing device 208, a fingerprint area sensor 212 to detect a finger in contact with the fingerprint area sensor and to capture a fingerprint sensor image of the detected finger, an illumination source 220 to provide different conditions of illumination light, and multi-spectral optical sensor arrays 222-1 and 222-2 to capture spectral reflectance data of the detected finger. Illumination source 220 may be a broad-spectrum white light emitting diode (LED). In the exemplary embodiment illustrated in FIG. 2A, illumination source 220 and multi-spectral optical sensor arrays 222-1 and 222-2 may be located in close proximity to fingerprint area sensor 212 so that a user may place their finger on illumination source 220, multi-spectral optical sensor arrays 222-1 and 222-2, and fingerprint area sensor 212 at the same time, which may allow multi-spectral optical sensor arrays 222-1 and 222-2 to capture valid spectral reflectance data of the detected finger. As depicted, fingerprint sensor device 200 may also include a sensor cover 204 coupled to PCB 202 to protect fingerprint area sensor 212, illumination source 220, and multi-spectral optical sensor arrays 222-1 and 222-2 during contact of a finger.

Fingerprint area sensor 212 may be a capacitive based fingerprint reader that may capture a fingerprint sensor image including biometric data of a detected finger that may make up a fingerprint. Signal processing device 208 may collect the fingerprint sensor image including the biometric data of the detected finger from fingerprint area sensor 212. Signal processing device 208 may extract salient features of the biometric data of the detected finger from the fingerprint sensor image, described in further detail below with reference to FIG. 3. The salient features of the biometric data of the reference fingerprint sensor image may be ridges and valleys that make up the reference fingerprint, points where ridge lines end or where one ridge splits into two (bifurcations), relevant positions of the biometric data, among other features, also referred herein as minutiae.

Multi-spectral optical sensor arrays 222-1 and 222-2 may capture the spectral reflectance data including biometric data of the detected finger under controlled illumination conditions provided by illumination source 220, which may result in somewhat different and complementary information about the detected finger, described in further detail below with reference to FIG. 3. The controlled illumination conditions may include different wavelengths, different polarization conditions, and different illumination orientations. Multi-spectral optical sensor arrays 222-1 and 222-2 may be wavelength multiplexed in a fashion that may provide an optimized spectral resolution of the spectral reflectance data that may be tuned to the spectral reflectance of human skin. The spectral sensing bands of multi-spectral optical sensor arrays 222-1 and 222-2 may provide the optimized spectral resolution of the spectral reflectance data in wavelengths that may correspond to unique absorption characteristics of human skin. The number and quality of the spectral sensing bands may be optimized to provide high spectral resolution in regions of the electromagnetic spectrum that represent unique absorption patterns of hemoglobin, melanin, or other biologic materials present in human skin tissue. The number and quality of spectral bands may be additionally optimized to provide low spectral resolution in regions of the electromagnetic spectrum that do not represent unique absorption patterns in human biologic tissues. These optimizations may provide advantages concerning the size and complexity of the multi-spectral optical sensing devices, and by extension the size and complexity of the signal processing device 208. The controlled illumination conditions provided by illumination source 220 penetrates the skin of the finger to varying depths, and component wavelengths are absorbed and reflected differently by the various chemical and biologic tissue components of the skin. The degree to which reflected illumination from the surface and subsurface features contribute to the spectral reflectance data may change according to the different polarization conditions. Finally, the location and degree to which surface features are accentuated may be altered by different illumination orientations.

Signal processing device 208 may collect the spectral reflectance data including the biometric data of the detected finger from multi-spectral optical sensor arrays 222-1 and 222-2. Signal processing device 208 may create a reference spectral profile associated with the respective placement of the finger in contact with fingerprint area sensor 212 that may be based on the spectral reflectance data of the detected finger by mapping the spectral fluctuations of the spectral reflectance data of the detected finger. The spectral fluctuations may include the different wavelengths of illumination light, the different polarization conditions, and the illumination orientations, among other captured information.

In one or more embodiments, signal processing device 208 may determine whether the controlled illumination conditions present during placement of the finger in contact with fingerprint area sensor 212 were suitable for capturing accurate spectral reflectance data. Signal processing device 208 may utilize the accuracy information of the spectral reflectance data to provide feedback to a user to refine the placement of their finger in contact with fingerprint area sensor 212. Multiple illumination sources may also be utilized, and may be utilized consecutively, simultaneously, or in a prescribed order. Additionally, multiple illumination sources may be located internally or externally with respect to fingerprint sensor device 200, and may be arranged in such a way that the shading on the finger created by the multiple illumination sources provides a further enhancement to the rejection of malicious attempts. A broadband illumination source may also be utilized, which may rely on wavelength discrimination capabilities that multi-spectral optical sensor arrays 222-1 and 222-2 may have, to provide an optimized spectral sensing profile for human skin.

In one or more embodiments, signal processing device 208 may also utilize multi-spectral optical sensor arrays 222-1 and 222-2 as an ambient light sensing device for other, non-fingerprint purposes.

Figure 2B:
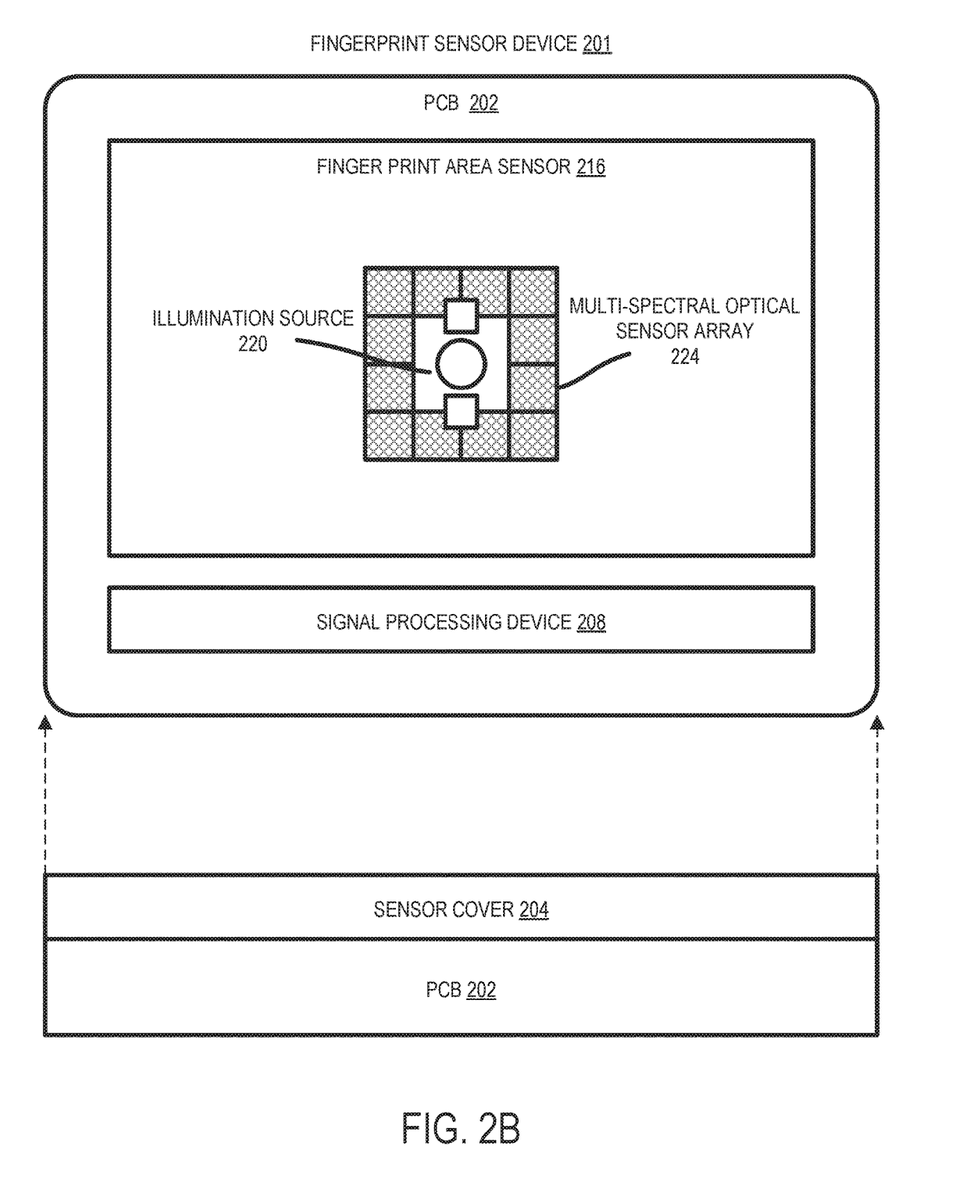

Turning now to FIG. 2B, a block diagram of selected elements of an embodiment of a fingerprint sensor device 201 is illustrated. Fingerprint sensor device 201 is structurally and functionally similar to fingerprint sensor device 200, as previously described.

As shown in FIG. 2B, components of fingerprint sensor device 201 may include, but are not limited to, printed circuit board (PCB) 202, sensor cover 204, signal processing device 208, a fingerprint area sensor 216 that may be functionally similar to fingerprint area sensor 212, illumination source 220, and a multi-spectral optical sensor array 224 that may be functionally similar to multi-spectral optical sensor arrays 222-1 and 222-2. Illumination source 220 and multi-spectral optical sensor array 224 may be integrated with fingerprint area sensor 216, which may ensure fingerprint sensor device 201 may be more resistant to compromise, usability, reliability, and manufacturability may be improved, and rejection of external illumination sources and light sources may be increased.

Figure 3:
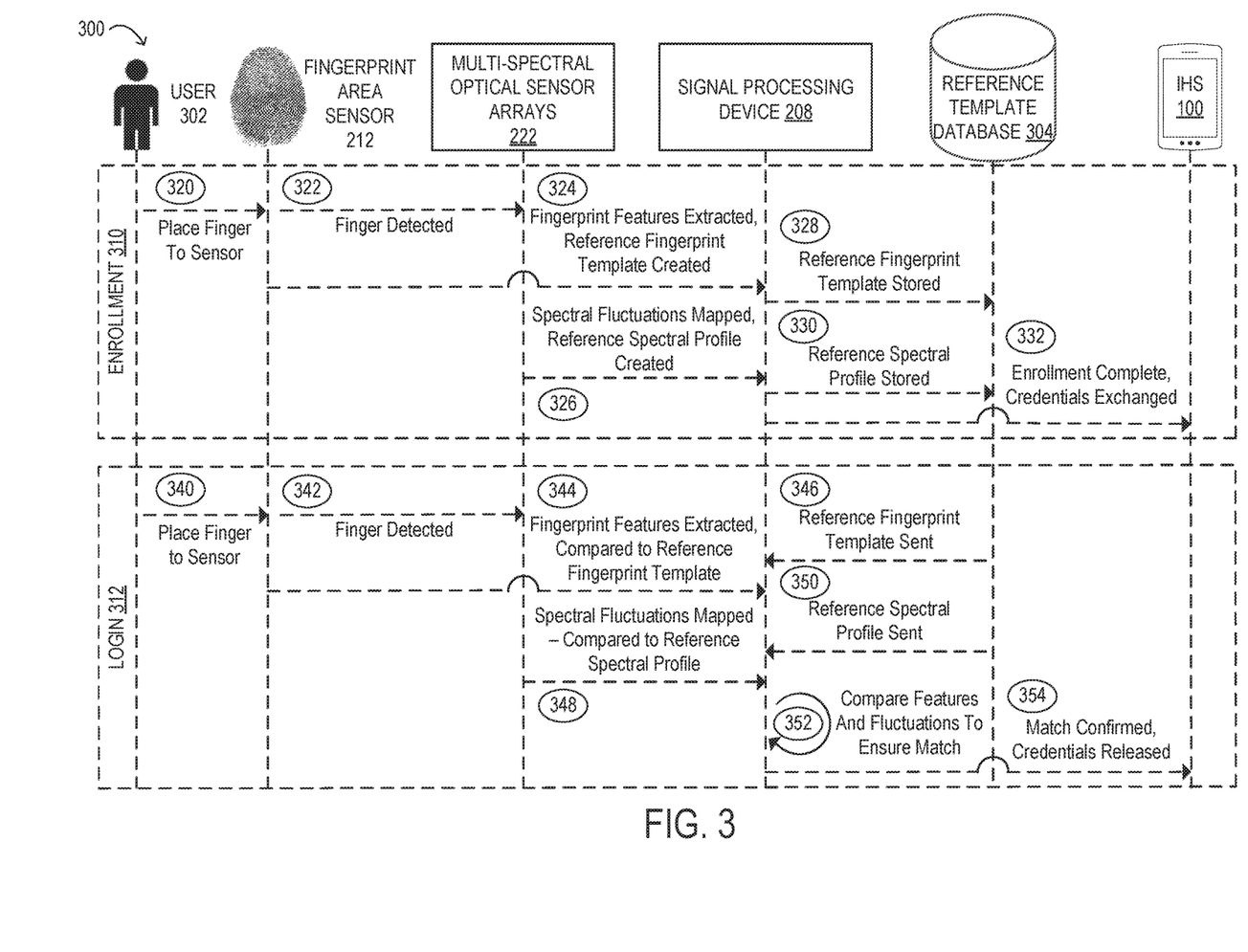
FIG. 3 is an event diagram of selected events of a method for fingerprint anti-spoofing protection using a multi-spectral optical sensor array in an embodiment of a fingerprint sensor device.

Turning now to FIG. 3, an event diagram 300 of selected events of an enrollment method 310 and a login method 312 for fingerprint anti-spoofing protection using a multi-spectral optical sensor array, as described herein. Enrollment method 310 and login method 312 may be performed using fingerprint sensor devices 200 and 201 (see FIGS. 2A and 2B) and, in particular, for events of fingerprint area sensor 212, illumination source 220, multi-spectral optical sensor arrays 222-1 and 222-2, and signal processing device 208. It is noted that certain operations described in event diagram 300 may be optional or may be rearranged in different embodiments.

Enrollment method 310 may begin by a user 302 enrolling with fingerprint sensor device 200 at event 320 of event diagram 300, by user 302 placing a finger in contact to fingerprint area sensor 212. At event 322, fingerprint area sensor 212 may detect the finger in contact with fingerprint area sensor 212 and may capture a fingerprint sensor image including biometric data of the detected finger. At event 324, signal processing device 208 may collect the fingerprint sensor image including the biometric data of the detected finger from fingerprint area sensor 212. Signal processing device 208 may extract the salient features of the biometric data of the finger from the fingerprint sensor image and create a reference fingerprint template associated with a respective placement of the detected finger in contact with the fingerprint area sensor 212.

At event 326, multi-spectral optical sensor arrays 222-1 and 222-2 may capture spectral reflectance data including biometric data of the detected finger under different conditions of illumination light provided by illumination source 220. Multi-spectral optical sensor arrays 222-1 and 222-2 may capture the spectral reflectance data during the capture of the fingerprint sensor image of the detected finger by fingerprint area sensor 212. Signal processing device 208 may collect the spectral reflectance data of the detected finger from multi-spectral optical sensor arrays 222-1 and 222-2. In one or more embodiments, signal processing device 208 may collect a minimum number of sets of spectral reflectance data of the detected finger, where the minimum number may be based on the number of sets of spectral reflectance data in a series needed to enable momentary live-ness detection. The minimum number of sets of spectral reflectance data may vary with respect to the size of fingerprint area sensors 212 and 216 of fingerprint sensor devices 200 and 202 respectively and the desired application. An application with a priority on security may select a higher minimum number of sets of spectral reflectance data to increase the confidence of the spectral comparison. Alternatively, an application with a priority on user convenience may select a lower minimum number of sets of spectral reflectance data, and may further limit the minimum number of sets of spectral reflectance data to match the minimum number of sets of spectral reflectance data required for the pattern matching aspect of the fingerprint sensor device. The minimum number of sets of spectral reflectance data may be determined based on a specified confidence interval determined for each application where fingerprint sensor devices 200 and 201 may be employed. Additionally, new spectral reflectance data may be continually collected as fingerprint sensor devices 200 and 201 are utilized subsequent to enrollment. The continuous collection and addition of new spectral reflectance data over time may improve the accuracy of fingerprint sensor devices 200 and 201, and may also compensate for gradual changes in either the human finger or fingerprint sensor devices 200 and 201 due to age or damage. Signal processing device 208 may collect the spectral reflectance data during the capture of the fingerprint sensor image of the finger by fingerprint area sensor 212. Capturing the fingerprint sensor image and the spectral reflectance data of the finger and collecting the spectral reflectance data of the finger at substantially the same time may ensure the spoofing countermeasure may not be easily defeated. Signal processing device 208 may map the spectral fluctuations of the spectral reflectance data including the biometric data of the finger. Signal processing device 208 may create a reference spectral profile associated with the respective placement of the finger in contact with fingerprint area sensor 212 that may be based on the spectral reflectance data of the finger and the map of the spectral fluctuations of the spectral reflectance data including the biometric data of the finger.

User 302 may continue enrollment method 310 by placing the finger in contact to fingerprint area sensor 212 one or more additional times, where each placement of the finger may be in a different position and a different region of the finger may be in contact to fingerprint area sensor 212. In response to the detection of each placement of the finger in contact to fingerprint area sensor 212, signal processing device 208 may create another reference fingerprint template associated with each respective placement of the finger and may create another reference spectral profile associated with each respective placement of the finger. At event 328, signal processing device 208 may add the plurality of reference fingerprint templates associated with each respective placement of the reference finger of user 302 to a reference fingerprint template database 304 by storing the one or more reference fingerprint templates at reference fingerprint template database 304. At event 330, signal processing device 208 may add the plurality of reference spectral profiles associated with each respective placement of the finger of user 302 to reference fingerprint template database 304 by storing the one or more reference spectral profiles at reference fingerprint template database 304. At event 332, signal processing device 208 may exchange enrollment credentials between signal processing device 208 and information handling system 100, which may complete the enrollment of user 302 with fingerprint sensor device 200. The finger associated with the reference fingerprint templates and the reference spectral profiles may also be referred herein as the reference finger.

Login method 312 may begin at event 340, by user 302 placing the finger in a particular position in contact to fingerprint area sensor 212. At event 342, fingerprint area sensor 212 may detect the finger in the particular position in contact with fingerprint area sensor 212 and may capture a login fingerprint sensor image including biometric data of the detected finger. At event 344, signal processing device 208 may collect the login fingerprint sensor image including the biometric data of the detected finger in the particular position from fingerprint area sensor 212. Signal processing device 208 may extract the salient features of the biometric data of the finger from the login fingerprint sensor image and may create a login fingerprint template associated with the finger in the particular position in contact with the fingerprint area sensor 212, similar to event 324 of enrollment method 310. At event 346, signal processing device 208 may receive the plurality of reference fingerprint templates associated with each respective placement of the reference finger of user 302 sent from reference fingerprint template database 304.

Event 348 is similar to event 326 of enrollment method 310. At event 348, multi-spectral optical sensor arrays 222-1 and 222-2 may capture login spectral reflectance data including biometric data of the detected finger in the particular position in contact with fingerprint area sensor 212 under different conditions of illumination light provided by illumination source 220. Multi-spectral optical sensor arrays 222-1 and 222-2 may capture the login spectral reflectance data during the capture of the login fingerprint sensor image of the detected finger by fingerprint area sensor 212. Signal processing device 208 may collect the login spectral reflectance data of the detected finger in the particular position in contact with fingerprint area sensor 212 from multi-spectral optical sensor arrays 222-1 and 222-2. In one or more embodiments, signal processing device 208 may collect the pre-determined number of the login spectral reflectance data of the detected finger. Signal processing device 208 may collect the login spectral reflectance data during the capture of the login fingerprint sensor image of the finger by fingerprint area sensor 212. Signal processing device 208 may map the spectral fluctuations of the login spectral reflectance data including the biometric data of the finger in the particular position in contact with fingerprint area sensor 212. Signal processing device 208 may create a login spectral profile associated with the finger in the particular position in contact with fingerprint area sensor 212 that may be based on the login spectral reflectance data of the finger and the map of the spectral fluctuations of the login spectral reflectance data including the biometric data of the finger. At event 350, signal processing device 208 may receive the plurality of reference spectral profiles associated with each respective placement of the reference finger of user 302 sent from reference fingerprint template database 304.

At event 352, signal processing device 208 may perform a fingerprint analysis of the login fingerprint sensor image of the detected finger including the salient features of the biometric data of the detected finger with each of the plurality of reference fingerprint templates associated with the reference finger including the salient features of the biometric data of the reference finger that may determine whether a reference fingerprint template may match a placement of the detected finger in contact with fingerprint area sensor 212. The reference fingerprint template may be associated with one placement of the reference finger in contact with fingerprint area sensor 212. Signal processing device 208 may also provide a result of the fingerprint analysis, where a positive result of the fingerprint analysis indicates that the reference fingerprint template matches the placement of the detected finger in contact with fingerprint area sensor 212, and a negative result of the fingerprint analysis indicates that there is no match.

Signal processing device 208 may compare the login spectral reflectance data of the detected finger including the spectral fluctuations and the biometric data of the detected finger with each of the plurality of reference spectral profiles associated with the reference finger including the spectral fluctuations and the biometric data of the reference finger that may determine the reference spectral profile that may match a placement of the detected finger in contact with fingerprint area sensor 212. The reference spectral profile may be associated with one placement of the reference finger in contact with fingerprint area sensor 212.

Signal processing device 208 may perform proportional spectral analysis of the login spectral reflectance data of the detected finger including the spectral fluctuations and the biometric data of the detected finger and the determined reference spectral profile including the spectral fluctuations and the biometric data of the reference finger.

Signal processing device 208 may also provide a result of the proportional spectral analysis that may correspond to the similarity or dissimilarity of the detected finger compared to the reference finger. A positive result of the proportional spectral analysis indicates that the login spectral reflectance data of the detected finger matches the determined reference spectral profile of the reference finger and corresponds to the similarity of the detected finger compared to the reference finger. A negative result of the proportional spectral analysis indicates that there is no match and corresponds to the dissimilarity of the detected finger compared to the reference finger. The result of the fingerprint analysis may also include the result of the proportional spectral analysis implicitly or explicitly as part of a final authentication result.

Signal processing device 208 may combine the result of the proportional spectral analysis with the result of the fingerprint analysis result to create an authentication result that may attest to the similarity or dissimilarity of the detected finger to the reference finger. Signal processing device 208 may, when the authentication result indicates that the detected finger may be authentic, provide an indication that the detected finger may be authentic, when the authentication result indicates that the detected finger may be unauthorized, provide an indication that the detected finger may be unauthorized, when the authentication result indicates that the authentication result may be inconclusive, provide an indication that the detected finger may be inconclusive and a replacement of the finger in contact with the fingerprint area sensor may be justified, when the authentication result indicates that the detected finger may have been improperly analyzed, provide an indication that the detected finger may have been improperly analyzed and a replacement of the finger in contact with the fingerprint area sensor may be justified, and when the authentication result indicates that the detected finger may be malicious, provide an indication that the detected finger may be malicious and further action may be justified.

In one or more embodiments, signal processing device 208 may, when the authentication result indicates that the detected finger may not be authentic and may be unauthorized, provide an indication that the detected finger could not be properly analyzed. Signal processing device 208 may identify the login spectral reflectance data of the detected finger as malicious, by comparing the login spectral reflectance data of the detected finger to a database of known malicious attempts. If such a malicious attempt were to be reported with sufficient confidence, fingerprint sensor device 200 may take specific actions to discourage defeat of the authentication system. The specific actions may include requiring additional identity information from the user, requesting a different finger be presented, requesting authentication via a secondary device, requesting an alternate biometric be provided, such as a face image, an iris or retinal scan, and a palm print. These specific actions may also cause fingerprint sensor device 200 to temporarily or permanently deny further authentication attempts, destroy partitions of information within reference template database 304, and send a signal over a network interface informing an entity of the malicious access attempt, such as information handling system 100.

In one or more embodiments, the proportional spectral analysis may utilize the slope of spectral shift between a series of the login spectral reflectance data of the biometric data of the finger to provide momentary live-ness detection, which may be more efficient than waiting for full heartbeats to detect live-ness. In one or more embodiments, signal processing device 208 may capture several seconds of spectral fluctuations during enrollment method 310 to form a cyclical map of spectral data. During login method 312 when authenticating the finger of user 302, signal processing device 208 may infer a pulse rate from a rate of change for key indicator pixels of the cyclical map of the spectral data. Signal processing device 208 may compare the pulse rates to matching states in a reference spectral profile associated with the reference finger for at least three sets of captured spectral reflectance data to determine compliance, where a fast pulse rate may trigger a more rigorous algorithm. In one or more embodiments, the proportional spectral analysis may be based on relative versus absolute analysis, where the proportional spectral analysis accounts for baseline offsets due to changes in power of the illumination source over duration of time since the reference spectral profiles associated with a reference finger were created, among other sources of divergence from the time of enrollment. In one or more embodiments, the proportional spectral analysis may be based on a slope of spectral shift between the spectral data images of the detected finger and baseline offsets that may be due to changes in power of the illumination source over duration of time since the reference spectral profiles associated with a reference finger were created. The proportional spectral analysis may also be based on relative offsets from a median value, weighted offsets, or any other analysis technique capable of returning an accurate analysis of the login spectral reflectance data of the detected finger and the determined reference spectral profile.

In one or more embodiments, the performance of the proportional spectral analysis may be concurrent with the performance of the fingerprint analysis. In one or more embodiments, the proportional spectral analysis and the fingerprint analysis may be performed consecutively.

At event 354, when the indication that the detected finger is authentic, signal processing device 208 may send a confirmation that the detected finger is authentic and may release the login credentials to information handling system 100, which may complete login method 312.

Using a hardware based fingerprint sensor device including a fingerprint area sensor, an illumination source, and a multi-spectral optical sensor array, e.g. fingerprint sensor devices 200 and 201, fingerprint area sensors 212 and 216, illumination source 220, and multi-spectral optical sensor arrays 222-1, 222-2, and 224, at the time of fingerprint image capture and spectral reflectance data capture to detect spoofing attacks, decouples a fingerprint sensor device from an information handling system and may decrease the burden on the system resources and may decrease and minimize any accompanying usability impact, while providing a stronger spoofing countermeasure.

Figure 4:
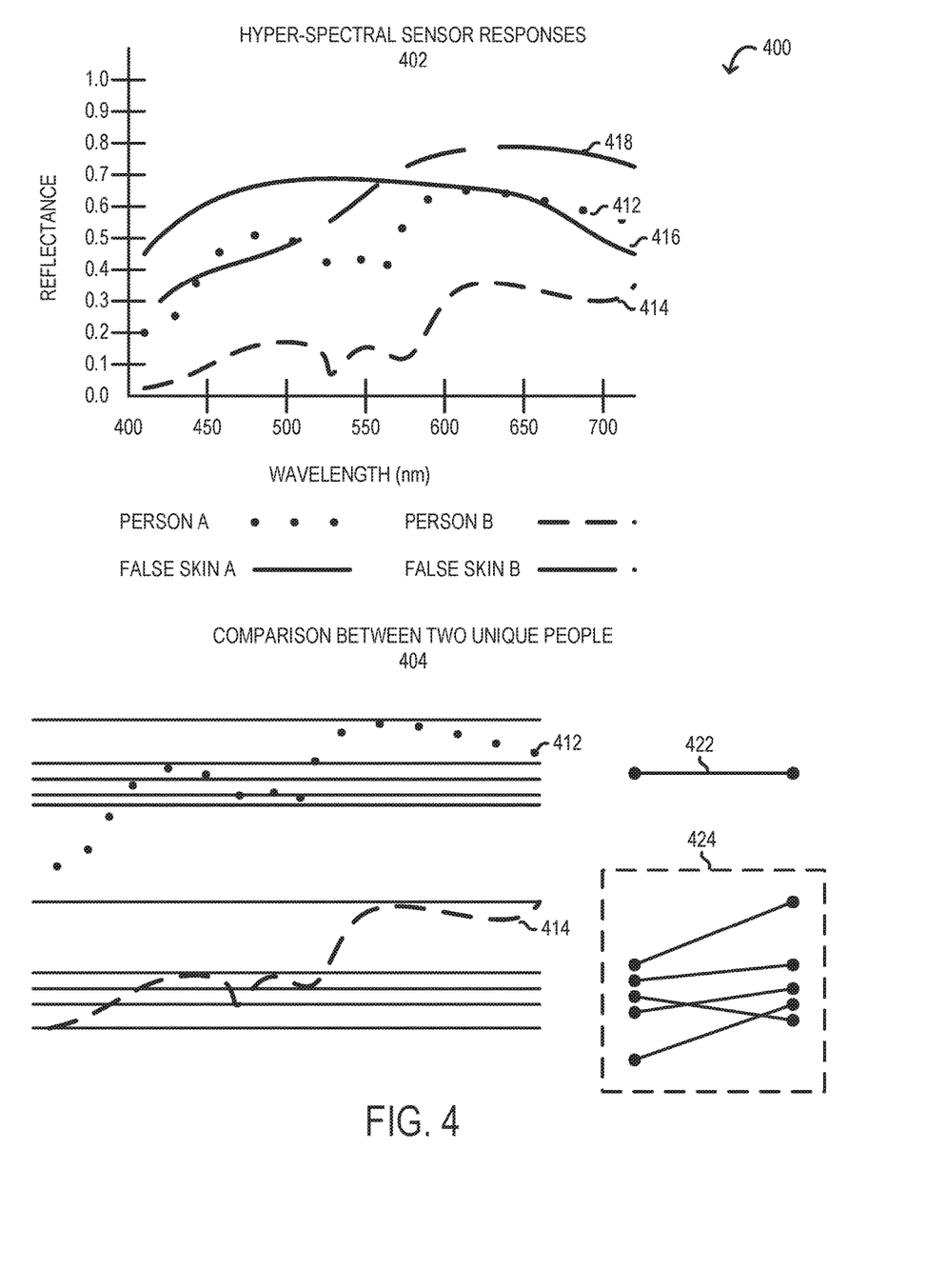
FIG. 4 is a graph of hyper-spectral sensor responses from selected elements of an embodiment of a fingerprint sensor device.

Turning now to FIG. 4, graphs 400 of hyper-spectral sensor responses from selected elements of an embodiment of a fingerprint sensor device, are illustrated.

Hyper-spectral sensor responses graph 402 depicts reflectance measurements at various wavelengths for the fingers of two people, person A 412 and person B 414, and for two false fingers, false skin A 416 and false skin B 418. Graph 402 shows the difference between real skin versus the fake skin, where the reflectance of the fake skin across the various wavelengths is higher than the reflectance of the real skin.

Graphs 404 depict the comparison between two unique people, person A 412 and person B 414, of their hyper-spectral sensor responses of graph 402.

Figure 5:
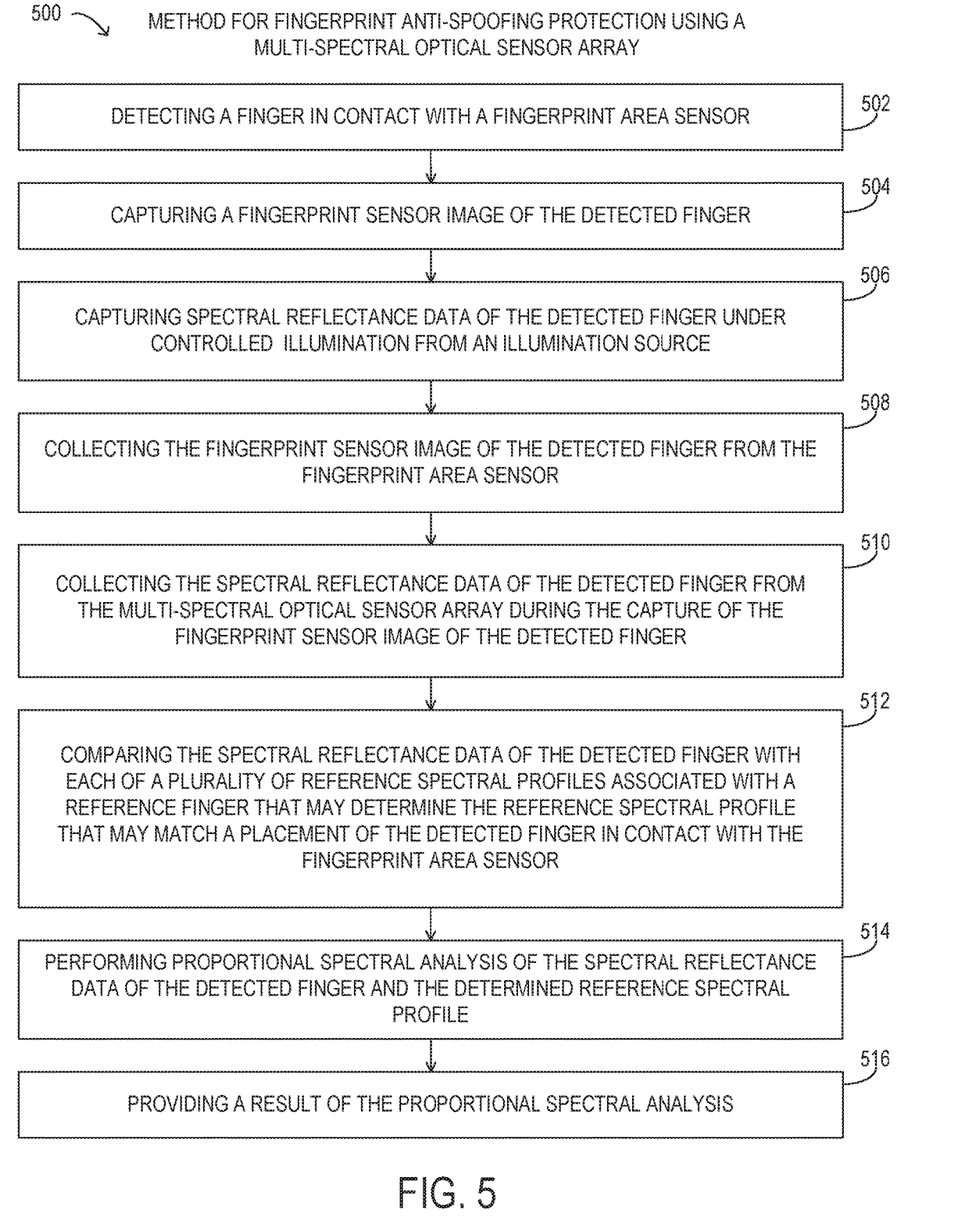
FIG. 5 is a flow chart of selected elements of a method for fingerprint anti-spoofing protection using a multi-spectral optical sensor array.

Referring now to FIG. 5, a flow chart of selected elements of a method 500 for fingerprint anti-spoofing protection using a multi-spectral optical sensor array, as described herein, is depicted in flowchart form. Method 500 may be performed using fingerprint sensor devices 200 and 201 (see FIGS. 2A and 2B) and, in particular, by fingerprint area sensors 212 and 216, illumination source 220, multi-spectral optical sensor arrays 222-1, 222-2, and 224, and signal processing device 208. It is noted that certain operations described in method 500 may be optional or may be rearranged in different embodiments.

Method 500 may begin at step 502, by detecting, by a fingerprint area sensor, a finger in contact with the fingerprint area sensor. At step 504, capturing, by the fingerprint area sensor, a fingerprint sensor image of the detected finger. At step 506, capturing, by a multi-spectral optical sensor array, spectral reflectance data of the detected finger under controlled illumination conditions. At step 508, collecting, by a signal processing device, the fingerprint sensor image of the detected finger from the fingerprint area sensor. At step 510, collecting, by the signal processing device, the spectral reflectance data of the detected finger from the multi-spectral optical sensor array during the capture of the fingerprint sensor image of the detected finger. At step 512, comparing, by the signal processing device, the spectral reflectance data of the detected finger with each of a plurality of reference spectral profiles associated with a reference finger that may determine the reference spectral profile that may match a placement of the detected finger in contact with the fingerprint area sensor. The reference spectral profile may be associated with one placement of the reference finger in contact with the fingerprint area sensor. At step 514, performing, by the signal processing device, proportional spectral analysis of the spectral reflectance data of the detected finger and the determined reference spectral profile. At step 516, providing, by the signal processing device, a result of the proportional spectral analysis.

As disclosed herein, systems and methods for fingerprint anti-spoof protection using a multispectral optical sensor array may include a fingerprint sensor device that may have a fingerprint area sensor, a multi-spectral optical sensor array, and a signal processing device. The fingerprint area sensor may detect a finger in contact with the fingerprint area sensor and may capture a fingerprint sensor image. The multi-spectral optical sensor array may capture spectral reflectance data of the detected finger. The signal processing device may determine authenticity of the detected finger based on the fingerprint sensor image and the spectral reflectance data and provide an authentication result.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A fingerprint sensor device, comprising:
   a fingerprint area sensor configured to:
   detect a finger in contact with the fingerprint area sensor; and
   capture a fingerprint sensor image of the detected finger;
   a multi-spectral optical sensor array configured to capture spectral reflectance data of the detected finger under controlled illumination conditions; and
   a signal processing device configured to:
   collect the fingerprint sensor image of the detected finger from the fingerprint area sensor;
   collect the spectral reflectance data of the detected finger from the multi-spectral optical sensor array during the capture of the fingerprint sensor image of the detected finger;
   compare the spectral reflectance data of the detected finger with each of a plurality of reference spectral profiles associated with a reference finger to determine the reference spectral profile that matches a placement of the detected finger in contact with the fingerprint area sensor, wherein the reference spectral profile is associated with one placement of the reference finger in contact with the fingerprint area sensor;
   perform proportional spectral analysis of the spectral reflectance data of the detected finger and the determined reference spectral profile;
   provide a result of the proportional spectral analysis;
   perform a fingerprint analysis of the fingerprint sensor image of the detected finger with each of a plurality of reference fingerprint templates associated with a reference finger to determine whether a reference fingerprint template matches a placement of the detected finger in contact with the fingerprint area sensor, wherein the reference fingerprint template is associated with one placement of the reference finger in contact with the fingerprint area sensor; and
   provide a result of the fingerprint analysis.

2. The fingerprint sensor device of claim 1, the fingerprint sensor device further comprising:
   an illumination source configured to:
   provide the controlled illumination conditions from the illumination source; and
   sense ambient light, wherein the controlled illumination conditions include different wavelengths, different polarization conditions, and different illumination orientations, and wherein the different wavelengths are divided across the spectrum to provide spectral detail in wavelengths corresponding to unique absorption characteristics of human skin.

3. The fingerprint sensor device of claim 1, the signal processing device further configured to:

combine the result of the proportional spectral analysis with the result of the fingerprint analysis to create an authentication result;

when the authentication result indicates that the detected finger is authentic, provide an indication that the detected finger is authentic;

when the authentication result indicates that the detected finger is unauthorized, provide an indication that the detected finger is unauthorized;

when the authentication result indicates that the authentication result is inconclusive, provide an indication that the detected finger is inconclusive and a replacement of the finger in contact with the fingerprint area sensor is justified;

when the authentication result indicates that the detected finger was improperly analyzed, provide an indication that the detected finger was improperly analyzed and a replacement of the finger in contact with the fingerprint area sensor is justified; and when the authentication result indicates that the detected finger is malicious, provide an indication that the detected finger is malicious and further action is justified.

4. The fingerprint sensor device of claim 2, wherein the proportional spectral analysis is based on a slope of spectral shift between the spectral reflectance data of the detected finger and baseline offsets due to changes in power of the illumination source over a duration of time since the reference spectral profiles associated with a reference finger were created.

5. The fingerprint sensor device of claim 1, the signal processing device further configured to, for each placement of the reference finger in contact with the fingerprint area sensor during enrollment of the reference finger with the fingerprint sensor device:

collect the spectral reflectance data of the reference finger from the multi-spectral optical sensor array during the capture of the fingerprint sensor image of the reference finger, wherein the multi-spectral optical sensor array captured the spectral reflectance data of the reference finger under the controlled illumination conditions;

create the reference spectral profile based on the spectral reflectance data of the reference finger; and add the reference spectral profile to the reference spectral profiles associated with the reference finger.

6. The fingerprint sensor device of claim 1, wherein the multi-spectral optical sensor array is located in proximity to the fingerprint area sensor.

7. The fingerprint sensor device of claim 1, wherein the multi-spectral optical sensor array is integrated with the fingerprint area sensor.

8. The fingerprint sensor device of claim 1, wherein the proportional spectral analysis and the fingerprint analysis are performed concurrently.

9. The fingerprint sensor device of claim 1, wherein the proportional spectral analysis and the fingerprint analysis are performed consecutively.

10. A method, comprising:

detecting, by a fingerprint area sensor, a finger in contact with the fingerprint area sensor;

capturing, by the fingerprint area sensor, a fingerprint sensor image of the detected finger;

capturing, by a multi-spectral optical sensor array, spectral reflectance data of the detected finger under controlled illumination conditions;

collecting, by a signal processing device, the fingerprint sensor image of the detected finger from the fingerprint area sensor;

collecting, by the signal processing device, the spectral reflectance data of the detected finger from the multi-spectral optical sensor array during the capture of the fingerprint sensor image of the detected finger;

comparing, by the signal processing device, the spectral reflectance data of the detected finger with each of a plurality of reference spectral profiles associated with a reference finger to determine the reference spectral profile that matches a placement of the detected finger in contact with the fingerprint area sensor, wherein the reference spectral profile is associated with one placement of the reference finger in contact with the fingerprint area sensor;

performing, by the signal processing device, proportional spectral analysis of the spectral reflectance data of the detected finger and the determined reference spectral profile;

providing, by the signal processing device, a result of the proportional spectral analysis;

performing a fingerprint analysis of the fingerprint sensor image of the detected finger with each of a plurality of reference fingerprint templates associated with a reference finger to determine whether a reference fingerprint template matches a placement of the detected finger in contact with the fingerprint area sensor, wherein the reference fingerprint template is associated with one placement of the reference finger in contact with the fingerprint area sensor; and providing a result of the fingerprint analysis.

11. The method of claim 10, further comprising:

providing the controlled illumination conditions from an illumination source; and sensing, by the multi-spectral optical sensor array, ambient light, wherein the controlled illumination conditions include different wavelengths, different polarization conditions, and different illumination orientations, and wherein the different wavelengths are divided across the spectrum to provide spectral detail in wavelengths corresponding to unique absorption characteristics of human skin.

12. The method of claim 10, further comprising:

combining the result of the proportional spectral analysis with the result of the fingerprint analysis to create an authentication result;

when the authentication result indicates that the detected finger is authentic, providing an indication that the detected finger is authentic;

when the authentication result indicates that the detected finger is unauthorized, providing an indication that the detected finger is unauthorized;

when the authentication result indicates that the authentication result is inconclusive, providing an indication that the detected finger is inconclusive and a replacement of the finger in contact with the fingerprint area sensor is justified;

when the authentication result indicates that the detected finger was improperly analyzed, providing an indication that the detected finger was improperly analyzed and a replacement of the finger in contact with the fingerprint area sensor is justified; and when the authentication result indicates that the detected finger is malicious, providing an indication that the detected finger is malicious and further action is justified.

13. The method of claim 11, wherein the proportional spectral analysis is based on a slope of spectral shift between the spectral reflectance data of the detected finger and baseline offsets due to changes in power of the illumination source over a duration of time since the reference spectral profiles associated with a reference finger were created.

14. The method of claim 10, further comprising:
for each placement of the reference finger in contact with the fingerprint area sensor during enrollment of the reference finger with the fingerprint sensor device:
collecting the spectral reflectance data of the reference finger from the multi-spectral optical sensor array during the capture of the fingerprint sensor image of the reference finger, wherein the multi-spectral optical sensor array captured the spectral reflectance data of the reference finger under controlled illumination conditions;
creating the reference spectral profile based on the spectral reflectance data of the reference finger; and
adding the reference spectral profile to the reference spectral profiles associated with the reference finger.

15. The method of claim 10, wherein the multi-spectral optical sensor array is located in proximity to the fingerprint area sensor.

16. The method of claim 10, wherein the multi-spectral optical sensor array is integrated with the fingerprint area sensor.

17. The method of claim 10, wherein the proportional spectral analysis and the fingerprint analysis are performed concurrently.

18. The method of claim 10, wherein the proportional spectral analysis and the fingerprint analysis are performed consecutively.

* * * * *